(12) United States Patent
Schalk et al.

(10) Patent No.: US 9,111,707 B2
(45) Date of Patent: Aug. 18, 2015

(54) INSTALLATION SWITCHING DEVICE WITH A CURRENT SENSING UNIT

(71) Applicant: ABB Schweiz AG, Baden (CH)

(72) Inventors: Adelbert Schalk, Wutöschingen (DE); Karlheinz Lutter, Blumberg (DE)

(73) Assignee: ABB SCHWEIZ AG, Baden (CH)

( * ) Notice: Subject to any disclaimer, the term of this patent is extended or adjusted under 35 U.S.C. 154(b) by 363 days.

(21) Appl. No.: 13/661,384

(22) Filed: Oct. 26, 2012

(65) Prior Publication Data

US 2013/0107412 A1    May 2, 2013

(30) Foreign Application Priority Data

Oct. 26, 2011    (EP) .................................... 11186636

(51) Int. Cl.
| | |
|---|---|
| *H02H 5/04* | (2006.01) |
| *H02H 9/08* | (2006.01) |
| *H01H 71/12* | (2006.01) |
| *H02H 3/08* | (2006.01) |
| *H02H 9/02* | (2006.01) |

(52) U.S. Cl.
CPC ....... *H01H 71/125* (2013.01); *H01H 2071/124* (2013.01); *H01H 2300/03* (2013.01); *Y02B 90/224* (2013.01); *Y04S 20/14* (2013.01)

(58) Field of Classification Search
USPC .......................................... 361/93.8; 36/93.8
See application file for complete search history.

(56) References Cited

U.S. PATENT DOCUMENTS

| 8,666,685 | B2 * | 3/2014 | Paik et al. ........................ 702/57 |
| 2005/0030049 | A1 * | 2/2005 | Chertok ........................ 324/661 |
| 2009/0174508 | A1 | 7/2009 | Watford et al. |
| 2009/0262138 | A1 * | 10/2009 | Bradbury et al. ............. 345/659 |
| 2011/0040506 | A1 | 2/2011 | Schalk et al. |

FOREIGN PATENT DOCUMENTS

| DE | 10031964 C1 | 2/2002 |
| DE | 10253018 A1 | 5/2004 |
| EP | 0750382 A2 | 12/1996 |
| EP | 2282321 A1 | 2/2011 |

OTHER PUBLICATIONS

European Search Report issued on Mar. 16, 2012, for European Application No. 11186636.4.

* cited by examiner

*Primary Examiner* — Dharti Patel
(74) *Attorney, Agent, or Firm* — Buchanan Ingersoll & Rooney PC

(57) ABSTRACT

An exemplary installation switching device includes such as a circuit breaker, residual current circuit breaker or motor circuit breaker, a housing, and at least one current path that passes through an internal conductor between at least one input terminal and at least one output terminal. The installation switching device also includes a current sensing unit inside the housing having an interface with at least two data connections and at least two power connections. The housing has an interface opening that is capable of accepting a connecting fixture for connecting the current sensing unit to a bus located outside the installation switching device and containing data and power lines such that the current sensing unit is electrically isolated from the current path and is supplied with power from outside the installation switching device.

19 Claims, 4 Drawing Sheets

INSTALLATION SWITCHING DEVICE WITH A CURRENT SENSING UNIT

RELATED APPLICATION

This application claims priority under 35 U.S.C. §119 to European application 11186636.4 filed in Europe on Oct. 26, 2011, the content of which is hereby incorporated by reference in its entirety.

FIELD

The disclosure relates to an installation switching device such as a circuit breaker, residual current circuit breaker or motor circuit breaker with a housing, and with at least one current path that passes an internal conductor between the input and the output.

BACKGROUND INFORMATION

Known installation switching devices are used in electrical installations to protect circuits and/or persons. Circuit breakers (CB) interrupt the current flow through the monitored conductor when excessive current flows or when there is a short circuit. For this purpose they include electromagnetic or thermal tripping devices, and one or more switching locks which, when activated by one of the tripping devices, interrupt the current path between the input and output terminals. Residual current circuit breakers (RCD) for the protection of persons are also known. A fault current occurs when the total of the current flowing into the installation is greater than the total of the current flowing out of the installation; the difference flows away to ground as a fault current. RCD circuit breakers include equipment for detecting the fault current. When such a current occurs it causes a tripping device to interrupt the current path between the input and output terminals.

It is known that information can be obtained about the present magnitude of the current flowing through the current path or paths of the switching device through the inclusion of an additional current transformer and an additional source of auxiliary voltage to supply the current transformer. EP 0 750 382 A2 illustrates this arrangement using the example of a low-voltage power switch used to switch off large currents when under load, and which is large in size compared to a usual circuit breaker. For a circuit breaker this solution means that an additional connection is specified for the neutral conductor, and the additional space specified in the device for the source of auxiliary voltage is lost. Such a solution can therefore not be used for circuit breakers, for the practical reason that not much space is available inside circuit breaker housings.

The additional information obtained through the additional current transformer is transmitted to a signal/control unit for monitoring, measurement or supervisory purposes.

As switching devices are increasingly networked in building automation systems, this facility for obtaining information about the magnitude of the current flowing in the current path or paths through the switching device, and of transmitting it to signal/control units for supervisory and monitoring purposes, is becoming more important.

EP 2 282 321 A1 discloses a module for measuring the current flowing in one conductor of a low-voltage distributor. The module containing the current sensor is plugged from the outside onto the housing of a circuit breaker, whereby a fastening tongue on the module is clamped firmly into one of the two terminal chambers in the double-row terminal of the circuit breaker. The increased space specification for the combination of circuit breaker and current measuring module is, however, disadvantageous here, as is the obstruction of one of the two terminal connection chambers, which is no longer available for the connection of, for instance, a power rail.

SUMMARY

An exemplary installation switching device is disclosed, comprising: a housing; a current path, which passes through an internal conductor between at least one input terminal and at least one output terminal; and a current sensing unit arranged inside the housing, the current sensing unit having an interface with at least two data connections and at least two power connections, wherein the housing has an interface opening which is configured to accept a connecting fixture for connecting the current sensing unit to a bus containing data and power lines, and wherein the bus is located outside the installation switching device such that the current sensing unit is galvanically isolated from a current path and is supplied with power from outside the installation switching device.

An exemplary installation switching device is disclosed, comprising: a current sensing unit arranged inside a housing, the current sensing unit having an interface with at least two data connections and at least two power connections and is connected to a data and power bus via the housing; and a current path, which passes through an internal conductor between at least one input terminal and at least one output terminal, wherein the current sensing unit is galvanically isolated from a current path and is supplied with power from outside the installation switching device.

BRIEF DESCRIPTION OF THE DRAWINGS

The disclosure, as well as other advantageous implementations and improvements to the disclosure, is explained in more detail and described with the help of the drawings, in which two exemplary embodiments of the disclosure are illustrated.

Assemblies or elements that are the same or that have the same effect are indicated with the same reference numerals in the figures.

DETAILED DESCRIPTION

Figure 1:
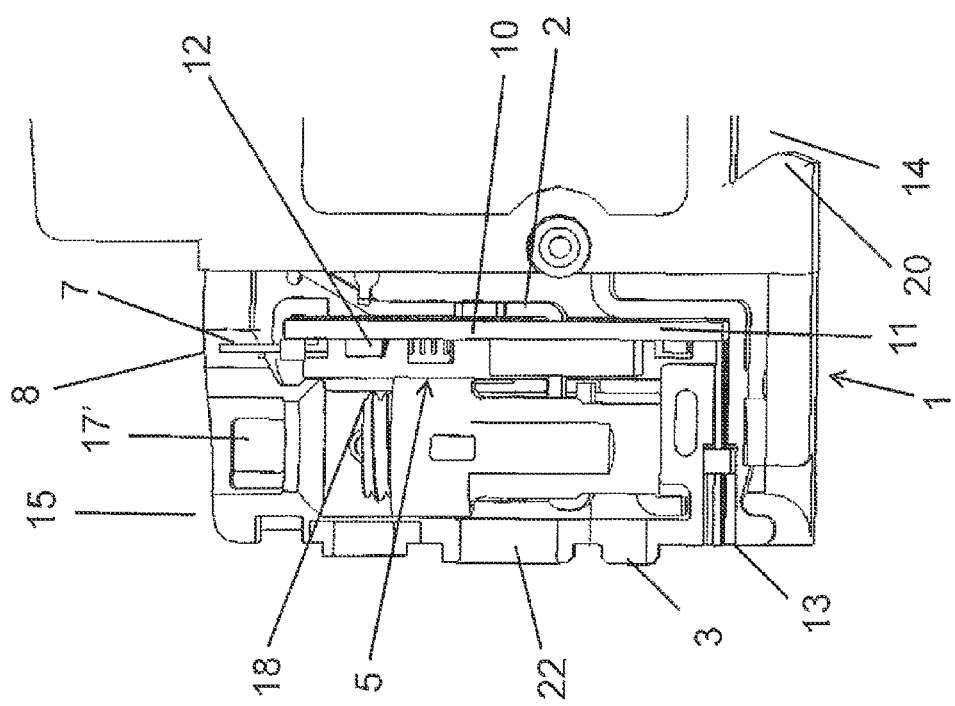
FIG. 1 illustrates a view into the terminal chamber of a first installation switching device in which an integrated current sensing module is fitted.

Exemplary embodiments of the present disclosure provide a switching device, such as a circuit breaker, in which the information about the magnitude of the current that is flowing in the current path or paths through the switching device is obtained without a detrimental effect on the external dimensions of the circuit breaker or on the connecting facilities, and without the requirement for a source of auxiliary voltage within the circuit breaker.

According to exemplary embodiments disclosed herein, a current sensing unit can be arranged inside the housing, and include an interface, whereby the interface has at least two power connections through which the data transmission may also be performed, or at least 2 power connections and 2 data lines, and whereby the housing has an interface opening that is capable of accepting a connecting fixture for connecting the current sensing unit to a bus containing data and current lines located outside the installation switching device, so that as a result the current sensing unit is electrically (galvanically) isolated from the current path and is supplied with power from outside the installation switching device.

In addition, the data transmission may also take place through the power connections of the protective device, although in this case electrical (i.e. galvanical) isolation is no longer present.

In an exemplary embodiment according to the present disclosure the current sensing unit is integrated into the housing, so that it does not impair the external dimensions and the connection facilities of the installation switching device. It is therefore possible to replace a circuit breaker that is present in an existing installation by a circuit breaker with integrated current measurement, without the need for additional space. The current sensing unit is supplied with electrical operating power from outside the installation switching device, which saves space at the current sensing unit, so that it can be implemented in a very compact form and can also be mounted in the interior of a circuit breaker. The information relating to the operating current is advantageously made available outside the housing of the installation switching device on the same bus that provides power to the current sensing unit.

If the current sensing unit is electrically isolated (galvanically isolated) from the current path, the circuit breaker can be retrofitted, with only a little modification, for use with a current sensing unit. This saves costs, as a dedicated housing is no longer required for the current sensing unit, and saves space when fitting an installation switching device with integrated current measurement unit in a low voltage distribution installation, for instance in a switching cabinet.

According to one exemplary embodiment of the disclosure, the current sensing unit has a circuit board on which a current sensor and a microprocessor circuit are arranged. The microprocessor circuit acquires the measurement data from the current sensor, processes it, and takes care of its transmission to the outside via the data lines.

According to another exemplary embodiment of the disclosure, the current sensor is constructed with a ferromagnetic toroidal core that encloses an internal conductor. The conductor whose current is to be measured is coaxially enclosed by the toroidal ferromagnetic core. This permits a space-saving construction.

According to yet another exemplary embodiment of the disclosure, a slot is made axially in the toroidal core, in which a magnetic field probe is arranged. The output of the magnetic field probe is connected electrically to the microprocessor circuit.

The current sensor that is used according to the disclosure is what is known as an open-loop sensor. It measures the magnetic field of the conductor through which current is flowing directly. A sensor of this sort can be constructed very compactly. Wires, stranded wires or current rails comprising (e.g., consisting of) stamped and bent components can be used as the internal conductor. These have a small cross section. The core diameter of the toroidal core in the current sensor can be matched to the cross-section of the conductor. This makes it possible for the toroidal core to have a compact construction, as a result of which the dimensions of the current sensing unit as a whole are low enough for space still to be available for the current sensing unit in the interior of a circuit breaker.

According to another exemplary embodiment of the present disclosure, the current sensing unit is arranged close to a narrow side of the housing, whereby the circuit board is oriented parallel to the narrow side wall. Usually a terminal chamber that houses a connecting terminal is located close to the narrow side wall of a circuit breaker. Double-row terminals are often used as well as screwless push-in terminals. In these, a clamping frame, usually box-shaped, is moved up and down through the movement of a clamping screw. A current rail extends into the interior of the clamping frame and is connected to an internal conductor that continues further inside the device. The current rail divides the terminal chamber inside the clamping frame into upper and lower clamping regions, so that two different connecting conductors can be connected. The terminal chamber is usually partitioned off by an internal partition wall from the inside of the device and from the other assemblies that are mounted there such as, for instance, the thermal and magnetic tripping devices, the switching mechanism, and the contact point with the movable contact lever. The extremely compact construction of the exemplary current sensing unit of the present disclosure makes it possible for said current sensing unit to be positioned, for instance, close to such a partitioning wall. As a result, the current sensing unit is electrically separated both from the connecting terminal and from the other electrically live assemblies inside the device. The circuit board of the current sensing unit is then aligned parallel to the direction of movement of the clamping frame, and thus parallel to the narrow side wall.

According to other exemplary embodiment described herein, the circuit board can be mounted generally at whatever location and in whatever orientation may be advantageous in the light of space and production conditions. The arrangement parallel to the narrow side wall is one exemplary embodiment, but other positions are feasible.

The exemplary current sensor of the present disclosure is attached to the circuit board in such a way that the current rail that divides the interior of the clamping frame passes through the open interior of the toroidal core. This has the advantage that a circuit breaker with a current sensor and a circuit breaker without a current sensor differ only in the presence of the current sensing unit. No other design modifications are specified, and in particular nothing that affects the external dimensions or the arrangement of the assemblies inside. For this reason, the manufacture of a circuit breaker with an integrated current sensor can extremely easily be incorporated into the manufacturing procedure of a circuit breaker; only a few steps of the manufacturing process need to be modified through including the step of inserting and attaching the current sensor unit.

According to an exemplary embodiment of the present disclosure, the current sensing unit can also be arranged close to the fastening side of the housing, using the space that is available there in the interior of the circuit breaker.

According to one exemplary embodiment of the disclosure the interface opening is arranged on a narrow side of the housing. The interface to the sensing unit is then implemented in such a way that the connecting pins for making electrical contact with the sensing unit are brought up to the interface opening. Advantageously the interface opening of this embodiment is located on the side at which the conductor insertion opening to the connecting terminal is also located, somewhere between this conductor insertion opening and the fastening side of the housing. The bus line for connecting the current sensing unit is then mounted from the cable insertion side to the circuit breaker.

According to yet another exemplary embodiment of the present disclosure, the interface opening is arranged on a front side of the housing. The interface to the sensing unit is then implemented in such a way that the connecting pins for making electrical contact with the sensing unit are brought up to the interface opening. Advantageously, the interface opening of this exemplary embodiment is located on the side where the screw access opening for operating the clamping screw by means of a tool, such as a screwdriver, is also located, somewhere between this screw access opening and the operating handle on the front side of the housing. The bus line for connecting to the current sensing unit is then mounted from the front or operating side to the circuit breaker.

According to one exemplary embodiment of the disclosure, the installation switching device includes a temperature measuring unit for the early detection of a fault and/or for the detection of wear and tear (deterioration) in the installation switching device. This can be provided in order to measure a conductor temperature, a terminal temperature, a switching chamber temperature or a housing temperature. Advantageously the temperature measuring unit includes a temperature sensor arranged in the interior of the housing electrically connected to the microprocessor circuit, so that the measured temperature values can also, or in addition to the measurement of current, be transmitted to the outside over the data line of the bus.

The measurement of current or temperature provides early detection of an inappropriate drift in the current and/or temperature that would soon lead to failure of the plant. A servicing team can then take appropriate measures in good time. This is of particular advantage in "critical power" installations, where sudden failure may lead to enormous expense or harm to the public image.

A further advantageous application is that symmetrical distribution of the currents can be ensured in 3-phase consumer networks.

In another exemplary embodiment of the present disclosure, the temperature measuring unit can include a temperature sensor arranged outside the housing and electrically connected to the microprocessor circuit, so that the measured temperature values can also be transmitted to the outside over the data line of the bus.

The temperature measuring unit can detect the temperature of the connecting terminals or of particular assemblies or components in the installation switching device, and supply them for evaluation. Through evaluation of the temperature curve, a potentially faulty device condition that would lead to failure or destruction of the installation switching device can be detected early, since such circumstances are often preceded by an unusual increase in temperature while the device continues to function quite normally. The temperature curve can also be used as an input magnitude for service life models, so enabling predictive device diagnosis.

According to an exemplary embodiment of the present disclosure, a display device operated by the microprocessor circuit is arranged on the surface of the housing. This can, for instance, indicate the current loading of the conductor, as a percentage of the rated current, or of the permissible excess current, or the like.

In one exemplary embodiment, the display device can include at least one LED. A display device using LEDs is an easy yet highly effective method of display. It is possible for each of the LEDs to be assigned to a specified current range or to a range of percentage of the permitted rated or excess current, and to be activated when this current range is reached. A red LED can for instance indicate that the current has reached a critical range of values.

Figure 2:
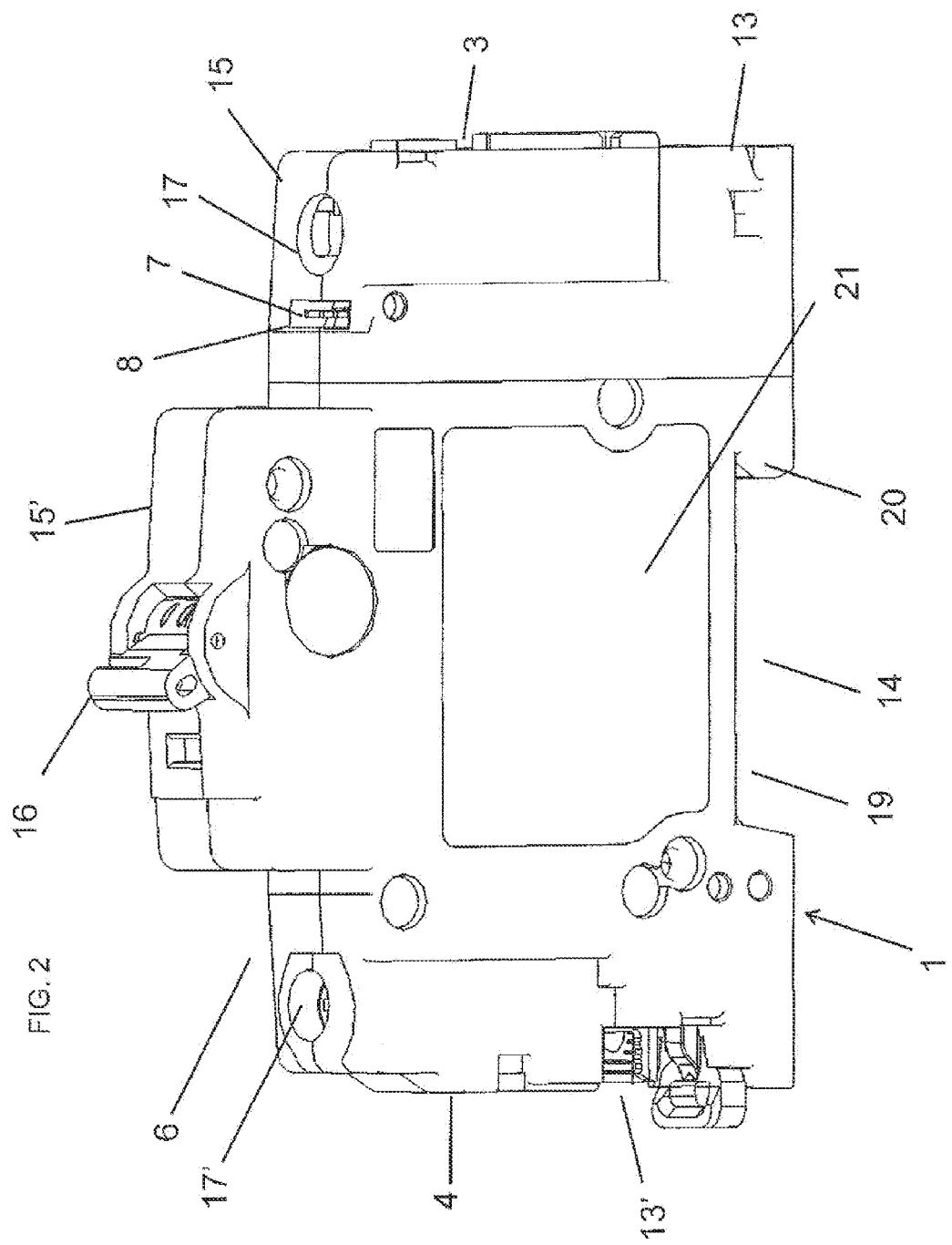
FIG. 2 illustrates a perspective view of the first installation switching device in accordance with an exemplary embodiment of the present disclosure.

FIG. 1 illustrates a view into the terminal chamber of a first installation switching device in which an integrated current sensing module is fitted. FIG. 2 illustrates a perspective view of the first installation switching device in accordance with an exemplary embodiment of the present disclosure. FIG. 2 shows a circuit breaker 1 with a housing 6 of insulating material. The housing 6 has a forward front side 15', where an operating lever 16 is constructed, by means of which the contact point that is located inside the housing 6 can be manually switched on or off. The housing also has a rear front side 15 where the access openings 17, 17' for the clamping screws 18 (see FIG. 1) of the input or output terminals 3, 4 are located. The fastening side 14 is located opposite the front side 15', and has a recess 19 that is delimited on one side by a fixed projection 20. The fixed projection is part of the holding mechanism with which the circuit breaker 1 can be clipped onto a standard profile rail, whereby a free limb of the standard profile rail is pushed behind the fixed projection 20. The front and fastening sides are joined by the broad sides 21 and the narrow sides 13, 13'. The access openings 22 (see FIGS. 1 and 4) through which the connecting lines to the input or output terminals 3, 4 are inserted, are located on the narrow sides 13, 13'.

Figure 3:
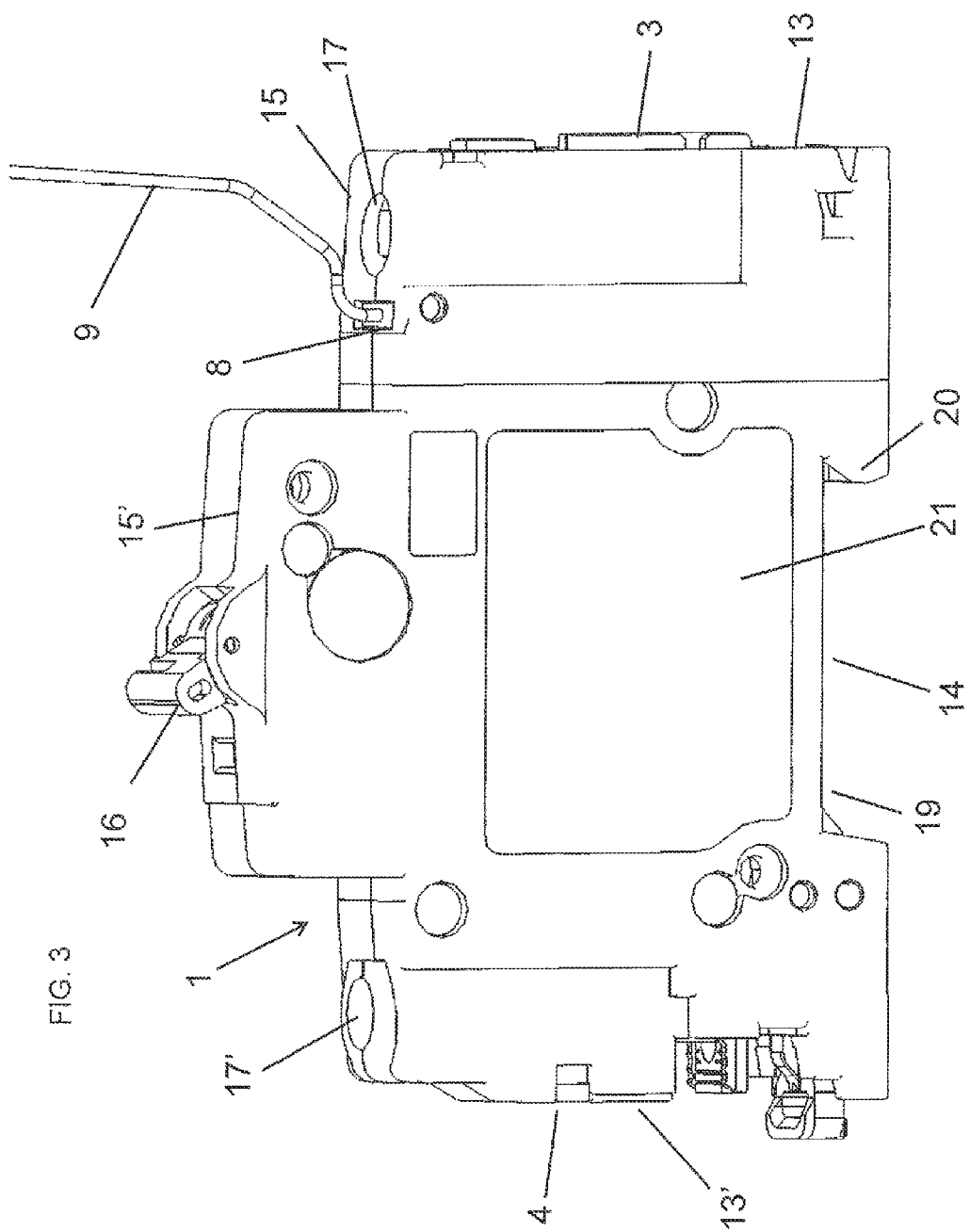
FIG. 3 illustrates a side view of the first installation switching device in accordance with an exemplary embodiment of the present disclosure, with an attached bus line.

An interface opening 8, having the shape of an approximately rectangular elongated hole is located on the housing 6 at the rear front side 15, between the access opening 17 and the transition to the forward front side 15'. Connecting pins 7 that form the interface to a current sensing unit 5 with a current sensor and microprocessor circuit integrated inside the housing can be seen in the elongated hole, see FIG. 1. In the illustration of FIG. 3, a plug terminal is inserted as a connecting fixture into the interface opening 8, and is electrically connected to the connecting pins 7. The plug connector is connected to a bus line 9. The bus line 9 has two data lines and two power lines. The two power lines supply electrical power to the current sensing unit 5 inside the housing, so that said current sensing unit is electrically separated from the other electrically live components inside the housing. The two data lines transmit the measured values of current, together with other data that may be acquired or determined in the current sensing unit, such as measured values of temperature from a temperature measuring unit that can also be connected to the microprocessor circuit of the current sensing unit, to the outside, for instance to a communication module or to a control and monitoring unit associated with an installation bus system.

FIG. 1 shows details of the current sensing unit, and how it is installed inside the housing. The current sensing unit 5 has a circuit board 10 on which a current sensor 11 and a microprocessor circuit 12 are arranged. A toroidal core, not illustrated in more detail, that essentially coaxially surrounds the internal conductor 2 that passes from the connecting terminal 3 to the interior of the housing is located inside the chamber 11 on the circuit board 10, as is a microprocessor circuit 12. A current sensor implemented as a magnetic field probe, for instance as a Hall probe, is located in a slot passing axially through the toroidal core, the output of the said current sensor being electrically conducted to the microprocessor circuit 12. The microprocessor circuit 12 is in turn electrically connected to the connecting pins 7 of the interface, of which two connecting pins constitute the two power connections while two connecting pins constitute the two data lines. FIG. 3 illustrates a side view of the first installation switching device in accordance with an exemplary embodiment of the present disclosure, with an attached bus line. As shown in FIG. 3, the microprocessor circuit can be connected over the bus line 9 to a communication module having an external voltage source of, for instance, 12 V or 24 V DC. Since the current sensing unit only detects the magnetic field from the current flowing in the internal conductor 2, it is electrically isolated from the internal conductor 2 and from the other electrically live components inside the housing, and is therefore not sensitive to the effect of short-circuit currents.

The current sensing unit 5 is arranged close to the narrow side 13 of the housing 6, and is located in the intermediate space between the terminal 3 and the interior of the housing that faces away from the terminal 3, whereby the circuit board 10 is oriented parallel to the narrow side wall 13.

Figure 4:
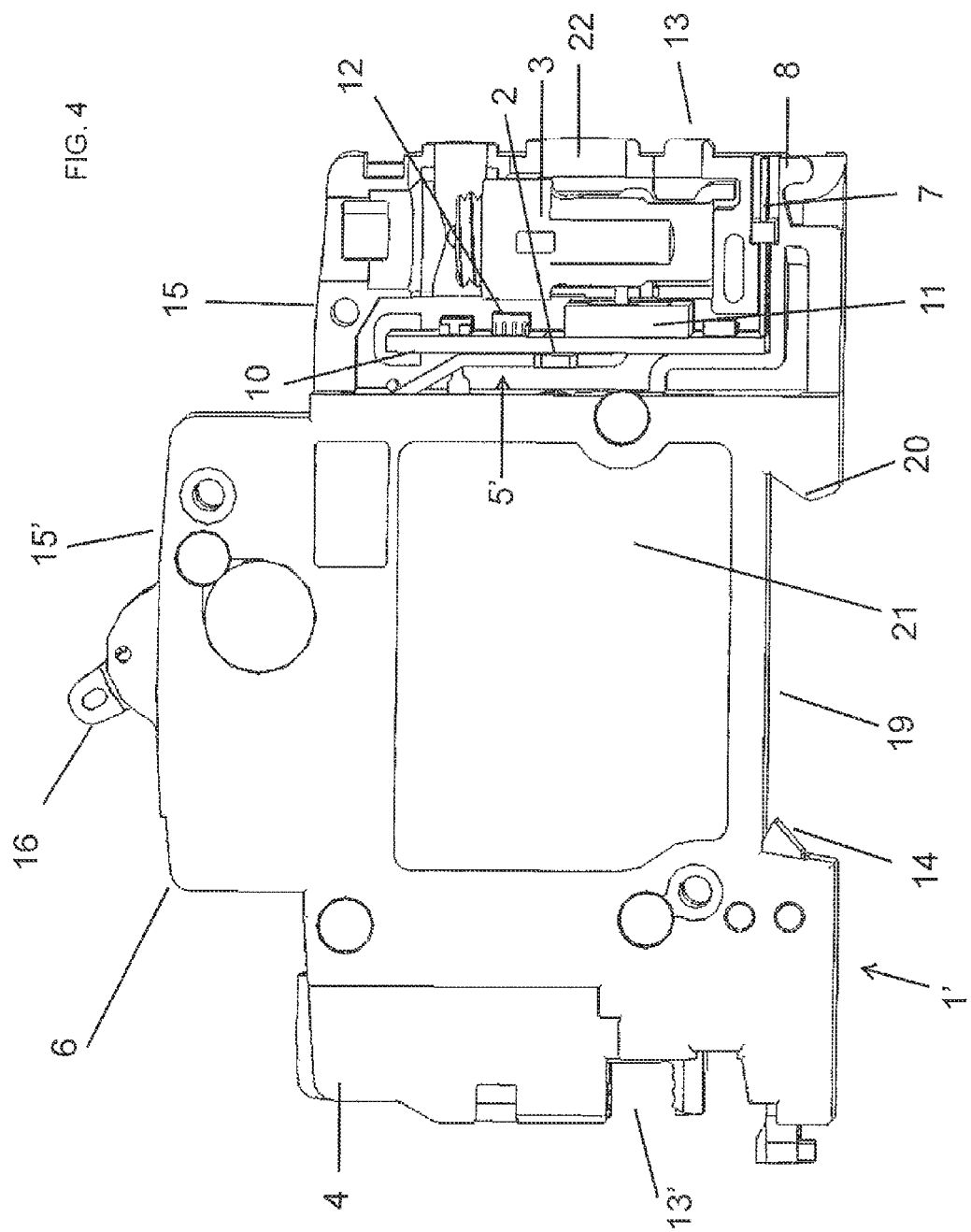
FIG. 4 illustrates a side view of a second installation switching device, where the cover of the terminal chamber is open in accordance with an exemplary embodiment of the present disclosure.

FIG. 4 illustrates a side view of a second installation switching device, where the cover of the terminal chamber is open in accordance with an exemplary embodiment of the present disclosure. FIG. 4 illustrates a further embodiment of a circuit breaker with integrated current sensor. The embodiment illustrated there differs from that of FIGS. 1 to 3 in that here the interface opening 8 is arranged on a narrow side 13 of the housing 6. The interface 7 to the current sensing unit 5' is then implemented in such a way that the connecting pins 7 for making electrical contact with the current sensing unit are bent at right angles from the circuit board 10, and thus extend perpendicularly to the circuit board 10 to the interface opening 8. The interface opening 8 of this embodiment is located on the side at which the conductor insertion opening 22 to the connecting terminal 3 is also located, somewhere between this conductor insertion opening 22 and the fastening side 14 of the housing 6. The bus line for connecting the current sensing unit is then mounted from the cable insertion side— the narrow side 13—to the circuit breaker 1.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMERAL LIST

| | |
|---|---|
| 1 | Installation switching device |
| 2 | Internal conductor |
| 3 | Input terminal |
| 4 | Output terminal |
| 5, 5' | Current sensing unit |
| 6 | Housing |
| 7 | Interface |
| 8 | Interface opening |
| 9 | Bus |
| 10 | Circuit board |
| 11 | Current sensor |
| 12 | Microprocessor circuit |
| 13, 13' | Narrow side |
| 14 | Fastening side |
| 15 | Rear front side |
| 15' | Forward front side |
| 16 | Operating lever |
| 17, 17' | Access opening |
| 18 | Clamping screw |
| 19 | Recess |
| 20 | Fixed projection |
| 21 | Broad side |
| 22 | Conductor insertion opening |

What is claimed is:

1. An installation switching device, comprising:
a housing;
a current path, which passes through an internal conductor between at least one input terminal and at least one output terminal; and
a current sensing unit arranged inside the housing, the current sensing unit having an interface with at least two data connections and at least two power connections,
wherein the housing has an interface opening which is configured to accept a connecting fixture for connecting the current sensing unit to a bus containing data and power lines, and
wherein the bus is located outside the installation switching device such that the current sensing unit is galvanically isolated from a current path and is supplied with power from outside the installation switching device.

2. The installation switching device as claimed in claim 1, wherein the current sensing unit has a circuit board on which a current sensor and a microprocessor circuit are arranged.

3. The installation switching device as claimed in claim 2, wherein the current sensor is constructed with a ferromagnetic toroidal core which encloses an internal conductor.

4. The installation switching device as claimed in claim 3, wherein a slot is made axially in the toroidal core in which a magnetic field probe is arranged.

5. The installation switching device as claimed in claim 4, wherein the output of the magnetic field probe is connected electrically to the microprocessor circuit.

6. The installation switching device as claimed in claim 1, wherein the current sensing unit is arranged at a narrow side of the housing in an intermediate space between the at least one input terminal and an interior of the housing that faces away from the input terminal, whereby the circuit board is oriented parallel to the narrow side wall.

7. The installation switching device as claimed in claim 1, wherein the current sensing unit is arranged at a fastening side of the housing.

8. The installation switching device as claimed in claim 1, wherein the interface opening is arranged on a narrow side of the housing.

9. The installation switching device as claimed in claim 1, wherein the interface opening is arranged on a front side of the housing.

10. The installation switching device as claimed in claim 1, wherein the installation switching device comprises a temperature measuring unit for at least one of a fault detection and a detection of deterioration in the installation switching device.

11. The installation switching device as claimed in claim 10, wherein the temperature measuring unit is provided for measuring a conductor temperature, a terminal temperature, a switching chamber temperature or a housing temperature.

12. The installation switching device as claimed in claim 10, wherein the temperature measuring unit comprises a temperature sensor arranged in an interior of the housing and electrically connected to the microprocessor circuit.

13. The installation switching device as claimed in claim 10, wherein the temperature measuring unit comprises a temperature sensor arranged outside the housing and electrically connected to the microprocessor circuit.

14. The installation switching device as claimed in claim 1, wherein a display device operated by the microprocessor circuit is arranged on a surface of the housing.

15. The installation switching device as claimed in claim 14, wherein the display device comprises at least one LED.

16. The installation switching device as claimed in claim 1, configured as a circuit breaker.

17. The installation switching device as claimed in claim 2, configured as a residual current circuit breaker.

18. The installation switching device as claimed in claim 2, configured as a motor circuit breaker.

19. An installation switching device, comprising:
- a current sensing unit arranged inside a housing, the current sensing unit having an interface with at least two data connections and at least two power connections and is connected to a data and power bus via the housing;
- a current path, which passes through an internal conductor between at least one input terminal and at least one output terminal,
- wherein the power bus is located outside the installation switching device such that the current sensing unit is galvanically isolated from a current path and is supplied with power from outside the installation switching device.

* * * * *